United States Patent
Lew et al.

(10) Patent No.: US 10,055,433 B2
(45) Date of Patent: Aug. 21, 2018

(54) REFERENCED CONTENT INDEXING

(71) Applicant: Microsoft Corporation, Redmond, WA (US)

(72) Inventors: Evan Ming Lew, Redmond, WA (US); Sandy Wong, Seattle, WA (US); Erik Theodore Bergman, Seattle, WA (US); Yu-Ting Kuo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 810 days.

(21) Appl. No.: 14/489,667

(22) Filed: Sep. 18, 2014

(65) Prior Publication Data

US 2016/0085780 A1    Mar. 24, 2016

(51) Int. Cl.
*G06F 17/30* (2006.01)

(52) U.S. Cl.
CPC .. *G06F 17/30312* (2013.01); *G06F 17/30616* (2013.01); *G06F 17/30696* (2013.01); *G06F 17/30864* (2013.01); *G06F 17/30867* (2013.01)

(58) Field of Classification Search
CPC ......... G06F 17/30312; G06F 17/30696; G06F 17/30616; G06F 17/30867; G06F 17/30864
See application file for complete search history.

(56) References Cited

U.S. PATENT DOCUMENTS

| | | | |
|---|---|---|---|
| 7,707,142 B1 | 4/2010 | Ionescu | |
| 7,716,217 B2 | 5/2010 | Marston et al. | |
| 8,589,374 B2 | 11/2013 | Chaudhri | |
| 2004/0210567 A1 | 10/2004 | Bourdoncle | |
| 2005/0149496 A1 | 7/2005 | Mukherjee et al. | |
| 2008/0027971 A1* | 1/2008 | Statchuk | G06F 17/30864 |
| 2009/0063448 A1 | 3/2009 | Depue et al. | |
| 2010/0169339 A1 | 7/2010 | Junqueira et al. | |
| 2012/0084328 A1 | 4/2012 | Ishikawa et al. | |
| 2012/0150833 A1 | 6/2012 | Parthasarathy et al. | |
| 2012/0150839 A1 | 6/2012 | Sundelin et al. | |

(Continued)

OTHER PUBLICATIONS

"International Search Report & Written Opinion Received for PCT Application No. PCT/US2015/050311", dated Nov. 2, 2015, 9 Pages.

(Continued)

*Primary Examiner* — Scott A. Waldron
*Assistant Examiner* — Andalib F Lodhi
(74) *Attorney, Agent, or Firm* — Shook, Hardy and Bacon, L.L.P.

(57) ABSTRACT

One or more techniques and/or systems are provided for indexing referenced content and/or for deep content searching. In an example, parent content (e.g., an instant message from a friend about a celebrity) may be evaluated to identify a reference (e.g., a URL) to referenced content hosted by a content source (e.g., a photo shared through a photo sharing service). The referenced content may be acquired from the content source, and may be evaluated to identify a search term that is descriptive of the referenced content (e.g., a name of the celebrity in the photo). The parent content and the referenced content may be indexed into a search index using the search term. In an example, responsive to a search query corresponding to the parent content and/or the search term, the parent content and/or the referenced content may be provided as search results.

20 Claims, 10 Drawing Sheets

(56) References Cited

U.S. PATENT DOCUMENTS

| | | |
|---|---|---|
| 2012/0179706 A1 | 7/2012 | Hobbs et al. |
| 2012/0226760 A1 | 9/2012 | Lewis |
| 2012/0272160 A1* | 10/2012 | Spivack .................. G06Q 10/10 715/752 |
| 2012/0323775 A1 | 12/2012 | Weinstein et al. |
| 2013/0166543 A1 | 6/2013 | Macdonald et al. |
| 2013/0170738 A1* | 7/2013 | Capuozzo ......... G06F 17/30265 382/159 |
| 2014/0282136 A1 | 9/2014 | Marantz et al. |
| 2014/0358958 A1 | 12/2014 | Mandic et al. |
| 2017/0006006 A1 | 1/2017 | Rawcliffe et al. |
| 2017/0168959 A1 | 6/2017 | Dodonov et al. |

OTHER PUBLICATIONS

"Second Written Opinion Issued in PCT Application No. PCT/US2015/050311", dated Mar. 3, 2016, 6 Pages.

"International Preliminary Report on Patentability Issued in PCT Application No. PCT/US2015/050311", dated Aug. 23, 2016, 7 Pages.

"Searching Confluence", Published on: Jun. 29, 2007, pp. 30 Available at: https://confluence.atlassian.com/display/DOC/Searching+Confluence#SearchingConfluence-Searchingthecontentofattachments.

"Advanced Search", Published on: Aug. 20, 2006, pp. 4 Avaiable at: http://trac.edgewall.org/wiki/AdvancedSearch.

"Lookeen—The Perfect Outlook Addon", Published on: Jul. 30, 2013, pp. 3 Available at: http://www.lookeen.net/product-overview/.

"Zehoo", Retrieved on: Mar. 7, 2014, pp. 2 Available at: https://vc4africa.biz/ventures/zehoo/groups/2232/invites/remove/13599/?_wpnonce=b5d19d6bc2.

"Searching within PDF Attachments", Published on: Nov. 10, 2009, pp. 1 Available at: http://www.msoutlook.info/question/360.

* cited by examiner

REFERENCED CONTENT INDEXING

BACKGROUND

Many users may discover content using search functionality. In an example, a user may locate files, such as images, documents, and/or other local files, using a file system search interface. In another example, the user may locate social network user profiles using a social network search interface. In another example, the user may locate emails, contacts, and/or appointments using an email search interface.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for indexing referenced content and/or for deep content searching are provided herein. In an example of indexing referenced content, parent content may be evaluated to identify a reference to referenced content hosted by a content source. The referenced content may be acquired from the content source using the reference. The referenced content may be evaluated to determine a search term that is descriptive of the referenced content. The referenced content may be indexed with the parent content into a search index using the search term.

When a search query is received, the search query may, for example, be run against the search index. Responsive to determining that the search query corresponds to the search term used to index the parent content and the referenced content, the parent content and/or the referenced content may be provided as a search result for the search query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
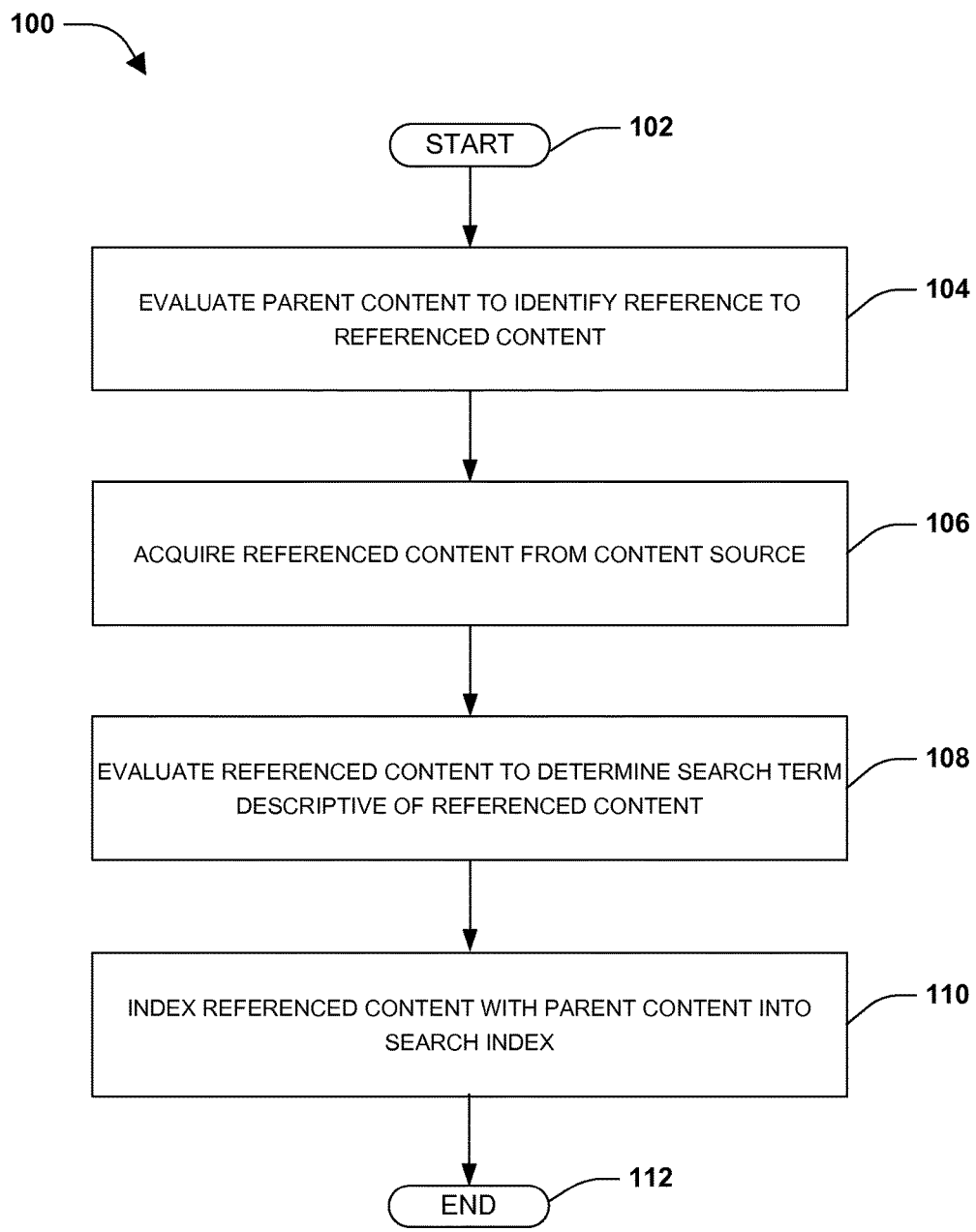
FIG. 1 is a flow diagram illustrating an exemplary method of indexing referenced content.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for indexing referenced content and/or for deep content searching are provided herein. Content relevant to a search conducted by a user may be referenced and/or deep within one or more other content sources (e.g., an attachment to an email, an article provided by a website that is linked to by a URL within a message, a photo from a social network post linked to by a URL within a document, etc.). However, because such content is referenced or nested within other content, this deep may not be provided as a search result. Accordingly, as provided herein, referenced content that is referenced by parent content (e.g., an attachment referenced content that is referenced by an email parent content, an article referenced content that is referenced by a message parent content, a photo referenced content that is referenced by a document parent content) may be indexed with the parent content, thus allowing the reference content to be provided as a search result.

An embodiment of indexing referenced content is illustrated by an exemplary method 100 of FIG. 1. At 102, the method starts. At 104, parent content may be evaluated to identify a reference to referenced content hosted by a content source. The parent content may comprise any type of content, such as a message, an email, a social network post, a document, a website, and/or any other content that may reference other content. In an example, the referenced content may comprise a website referenced by a URL within the parent content, an attached file attached to the parent content, content local to the parent content, content remote from the parent content, publically available content, non-publically available content (e.g., a corporate file accessible through a corporate file sharing service), an image, an article, a social network profile, a video, and/or any other content that may be referenced by parent content. The reference may comprise an indicator, such as a URL link, associated with the parent content. For example, a social network post "Hey Jen, what do you link of my wedding photo http://reference_to_photo/56732, regards Jill" may be identified as parent content. A photo URL reference, corresponding to the http://reference_to_photo/56732 URL link, of the social network post parent content may be identified as a reference to referenced content, such as wedding photo referenced content that was uploaded to a photo sharing service content source by Jill.

At 106, the referenced content may be acquired from the content source using the reference. For example, the photo URL reference may be used to access the wedding photo referenced content from the photo sharing service content source (e.g., using the http://reference_to_photo/56732 URL link). In an example, given user content, a set of credentials, utilized by a user, such as Jill, to access the content source may be identified (e.g., Jill may have provided affirmative consent for photo sharing service login credentials to be used to access the photo sharing service content source for the purpose of indexing referenced content and/or for providing referenced content as search results from deep content searching). The credentials may be utilized to authenticate with the content source so that the referenced content or a portion thereof may be acquired (e.g., retrieved, accessed, etc.).

At 108, the referenced content may be evaluated to determine a search term that is descriptive of the referenced content. It may be appreciated that a search term is not limited to a single term, but may comprise any number of terms, such as a phrase (e.g., "Wedding photo"). In an example, a term within the referenced content may be identified as a search term (e.g., a "Jill's wedding 2014" search term may be extracted from a caption of the wedding photo referenced content). In an example, image processing may be used to identify a search term (e.g., a "Jill" search term may be identified based upon image processing determining that the wedding photo referenced content depicts Jill). In an example, a website, comprising an anchor term that links to the referenced content, may be identified. The anchor term may comprise descriptive information for the referenced content. The search term may be determined based upon the descriptive information and/or the anchor term. For example, a celebrity webpage may comprise an actress Jill profile webpage that comprises an anchor term of "weddings" linking to the wedding photo referenced content. The anchor term may describe the wedding photo referenced content with descriptive information. A search term (e.g., a "celebrity Jill's wedding photo" search term) for the wedding photo referenced content may be determined based upon the anchor term on the celebrity webpage and/or the descriptive information of the anchor term. In an example, relevancy weights may be assigned to search terms. For example, a relatively higher relevancy weight may be assigned to the "celebrity Jill's wedding photo" search term because the "celebrity Jill's wedding photo" search term is derived from the anchor term that may provide a highly relevant descriptive summary of the wedding photo referenced content.

At 110, the referenced content may be indexed with the parent content into a search index using the search term. For example, the search index may comprise an inverted table where the search term is used to identify the parent content and/or the referenced content (e.g., identification of an association between the parent content and the referenced content, such that a search query matching the search term may result in the parent content and/or the referenced content being returned as search results). In an example, merely a portion of the referenced content (e.g., a summary or abstract of an article), may be indexed with the parent content into the search index using the search term. In this way, less than all of the referenced content may need to be indexed (e.g., thereby conserving storage resources).

In an example, a search query may be received. For example, a user may submit a search query "Jill's wedding" through a search interface. The search index may be evaluated using the search query. In an example, responsive to determining that the search query corresponds to the search term used to index the parent content and the referenced content, the parent content and/or the referenced content may be provided as a search result for the search query. In an example, responsive to determining that the search query corresponds to the parent content, the parent content and/or the referenced content may be provided as the search result for the search query (e.g., given that the parent content and the referenced content are linked by the search term). In an example, responsive to determining that the search query corresponds to the referenced content, the parent content and/or the referenced content may be provided as the search result for the search query (e.g., given that the parent content and the referenced content are linked by the search term). In an example, the search result may be annotated with an annotation identifying a source from which the content is provided (e.g., an annotation identifying a source from which the parent content is provided and/or an annotation identifying a source from which the referenced content is provided). At 112, the method ends.

Figure 2A:
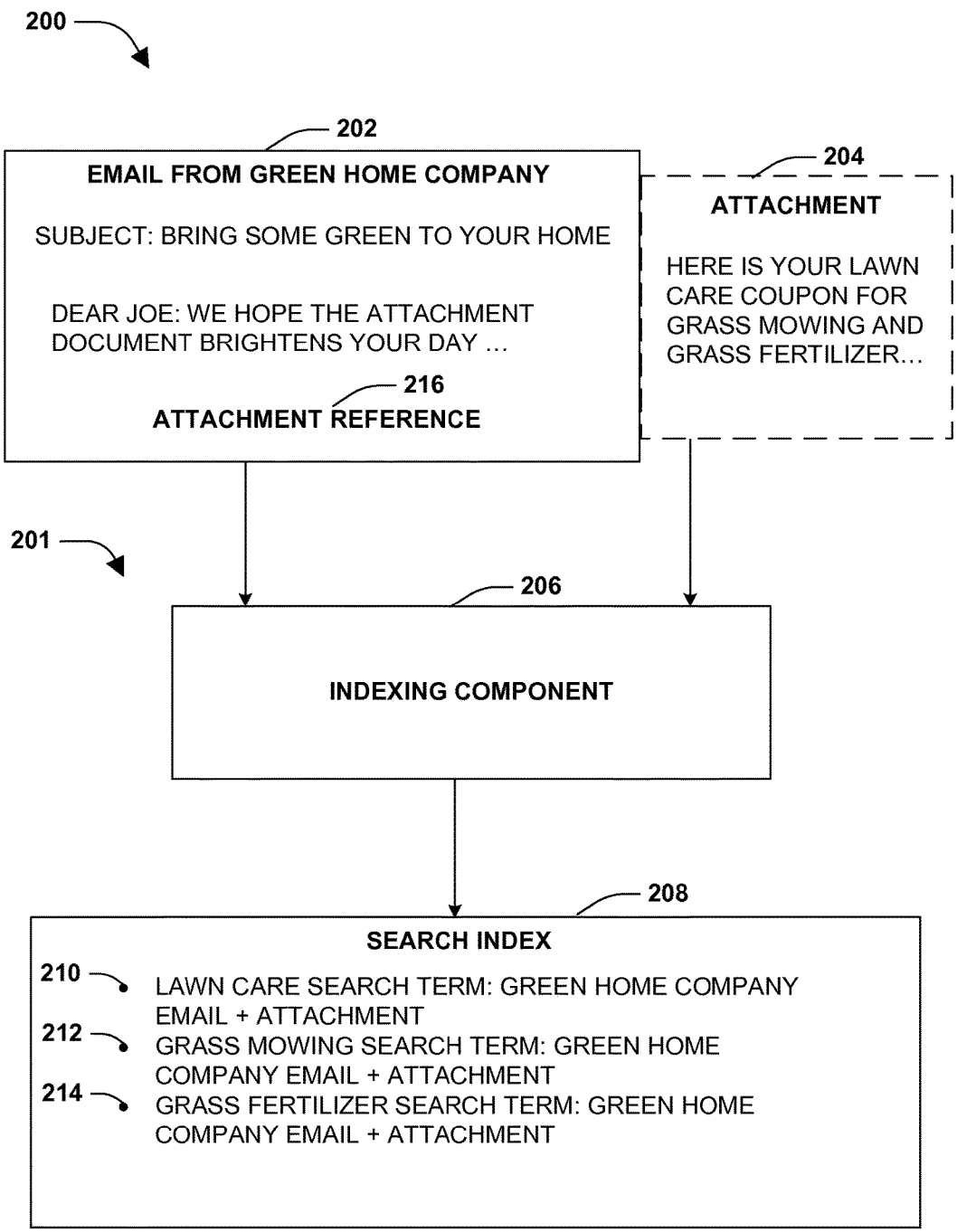
FIG. 2A is a component block diagram illustrating an exemplary system for indexing referenced content.

FIGS. 2A-2E illustrate examples of a system 201 comprising an indexing component 206 for indexing referenced content and/or a search component 262 for deep content searching. FIG. 2A illustrates an example 200 of the indexing component 206 identifying email parent content 202 corresponding to an email received by a user from a Green Home Company. The indexing component 206 may evaluate the email parent content 202 to identify an attachment reference 216 to email attachment coupon referenced content 204 corresponding to a Green Home Company coupon that is attached to the email parent content 202. The indexing component 206 may acquire the email attachment coupon referenced content 204 (e.g., the Green Home Company coupon may be downloaded, saved, and/or opened from the email parent content 202). The indexing component 206 may evaluate the email attachment coupon referenced content 204 to determine one or more search terms that are descriptive of the email attachment coupon referenced content 204. For example, a lawn care search term, a grass mowing search term, and a grass fertilizer search term may be identified as search terms that are descriptive of the Green Home Company coupon. Accordingly, the indexing component 206 may index the email parent content 202 with the email attachment coupon referenced content 204 using the lawn care search term to create a first indexed item 210, using the grass mowing search term to create a second indexed item 212, and using the grass fertilizer search term to create a third indexed item 214 for inclusion within a search index 208.

Figure 2B:
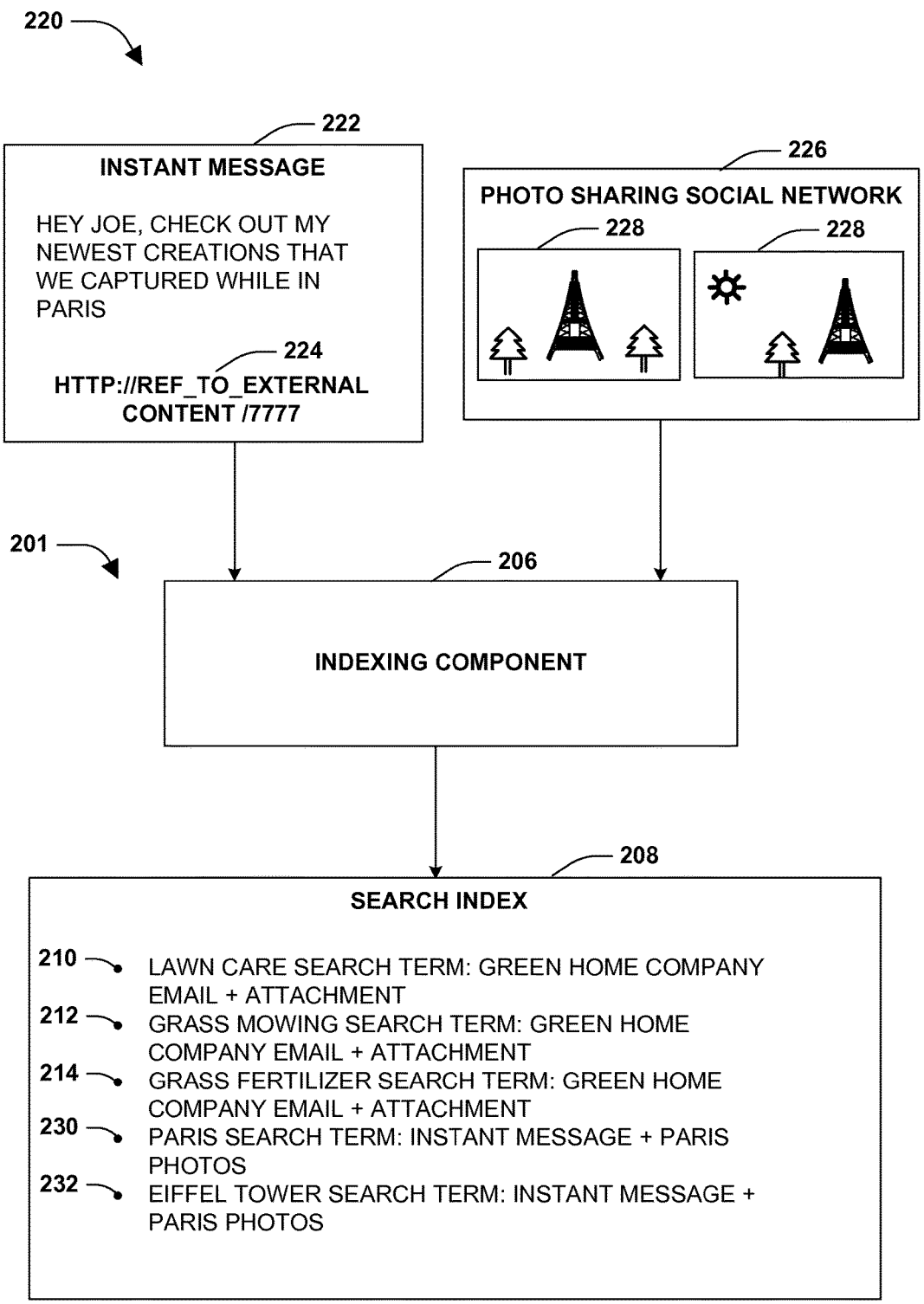
FIG. 2B is a component block diagram illustrating an exemplary system for indexing referenced content.

FIG. 2B illustrates an example 220 of the indexing component 206 identifying instant message parent content 222 corresponding to an instant message received by the user from a friend. The indexing component 206 may evaluate the instant message parent content 222 to identify a URL reference 224 to photo referenced content 228, corresponding to photos of Paris, shared through a photo sharing social network content source 226. The indexing component 206 may acquire the photo referenced content 228 (e.g., the photo referenced content 228 may be downloaded from the photo sharing social network content source 226 utilizing a set of credentials that the user uses to access the photo sharing social network content source 226). The indexing component 206 may perform image recognition upon the photo referenced content 228 to determine one or more search terms that are descriptive of the photo referenced content 228. For example, a Paris search term and an Eiffel tower search term may be identified as search terms that are descriptive of the photo referenced content 228. Accordingly, the indexing component 206 may index the instant message parent content 222 with the photo referenced content 228 using the Paris search term to create a fourth indexed item 230 and using the Eiffel tower search term to create a fifth indexed item 232 for inclusion within the search index 208.

Figure 2C:
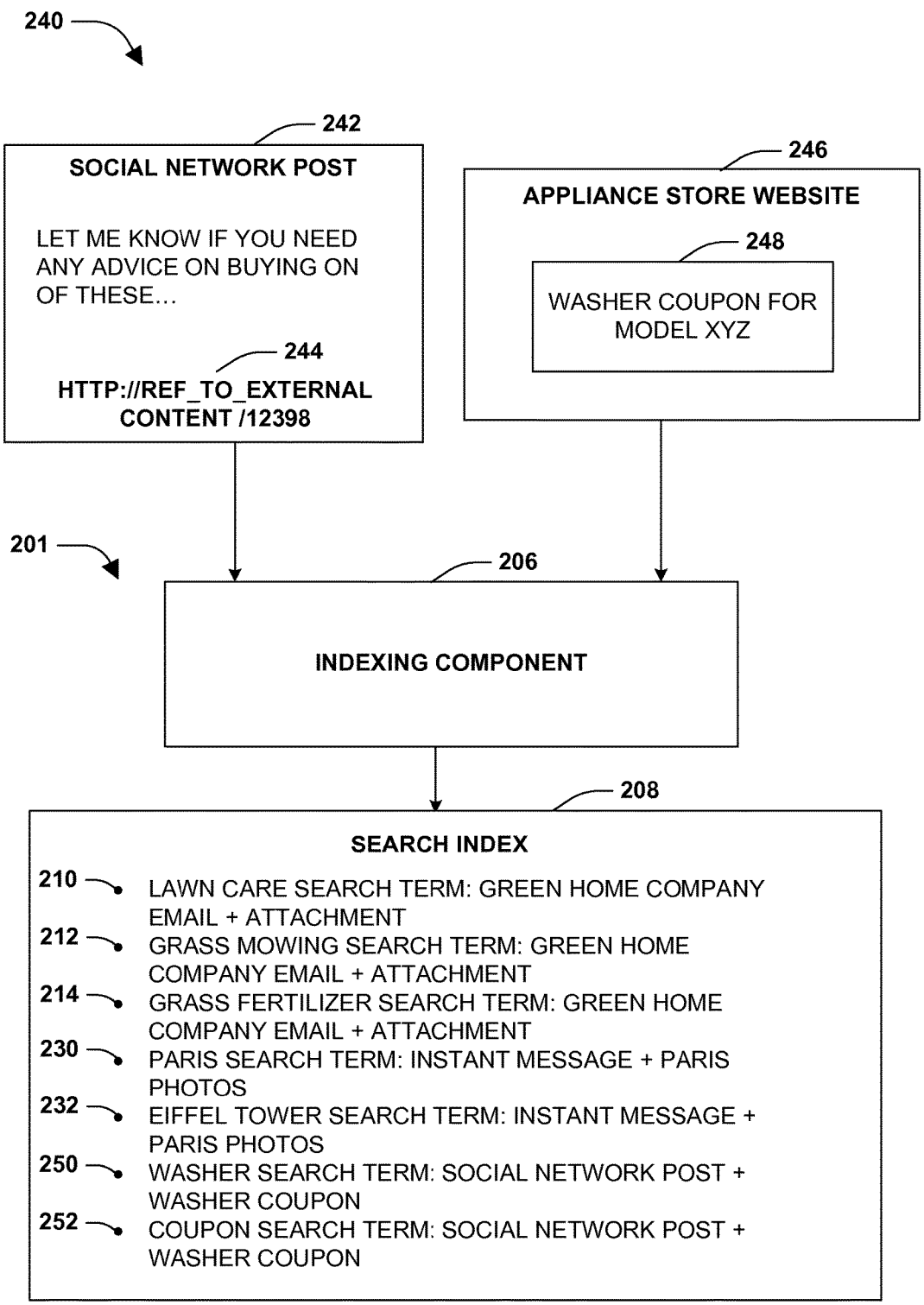
FIG. 2C is a component block diagram illustrating an exemplary system for indexing referenced content.

FIG. 2C illustrates an example 240 of the indexing component 206 identifying social network post parent content 242 corresponding to a social network post by a social network friend of the user. The indexing component 206 may evaluate the social network post parent content 242 to identify a URL reference 244 to washer coupon referenced content 248 provided by an appliance store website content source 246. The indexing component 206 may acquire the washer coupon referenced content 248 (e.g., the washer coupon referenced content 248 may be downloaded from the appliance store website content source 246). The indexing component 206 may evaluate the washer coupon referenced content 248 (e.g., using a text parser and/or a classifier such as a topic classifier) to determine one or more search terms that are descriptive of the washer coupon referenced content 248. For example, a washer search term and a coupon search term may be identified as search terms that are descriptive of the washer coupon referenced content 248. Accordingly, the indexing component 206 may index the social network parent content 242 with the washer coupon referenced content 248 using the washer search term to create a sixth indexed item 250 and using the coupon search term to create a seventh indexed item 252 for inclusion within the search index 208.

Figure 2D:
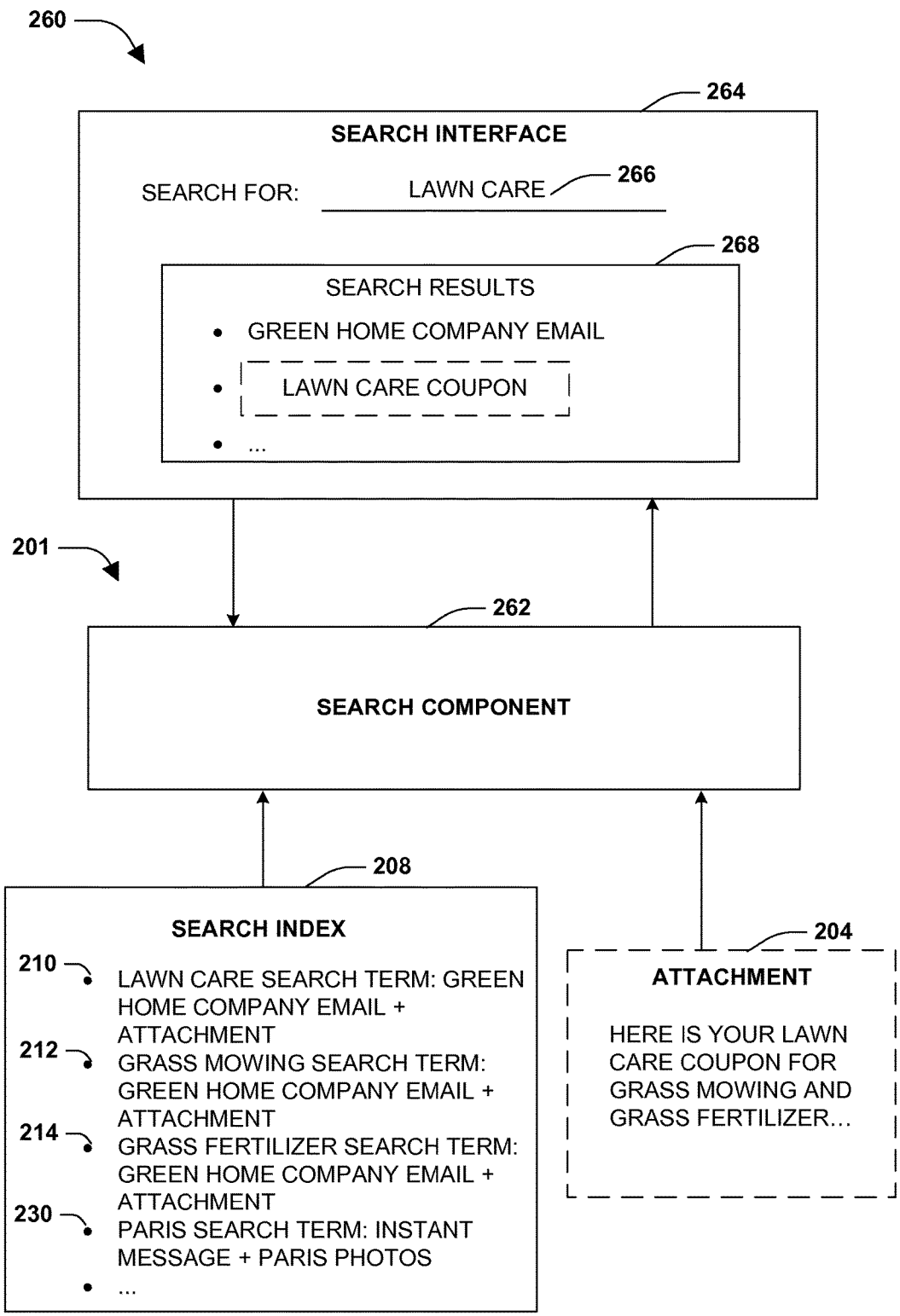
FIG. 2D is a component block diagram illustrating an exemplary system for deep content searching.

FIG. 2D illustrates an example 260 of deep content searching by the search component 262. The search component 262 may be configured to receive a search query (e.g., a lawn care search query 266) from a search interface 264. The search component 262 may evaluate the search index 208 using the lawn care search query 266. For example, the search component 262 may determine that the first indexed item 210 associated with the lawn care search term, the second indexed item 212 associated with the grass mowing search term, and the third indexed item 214 associated with the grass fertilizer search term correspond to the lawn care search query 266. Accordingly, the search component 262 may provide the email parent content 202 associated with the Green Home Company and/or the attachment coupon referenced content 204 of the Green Home Company coupon as search results 268, for the lawn care search query 266, through the search interface 264.

Figure 2E:
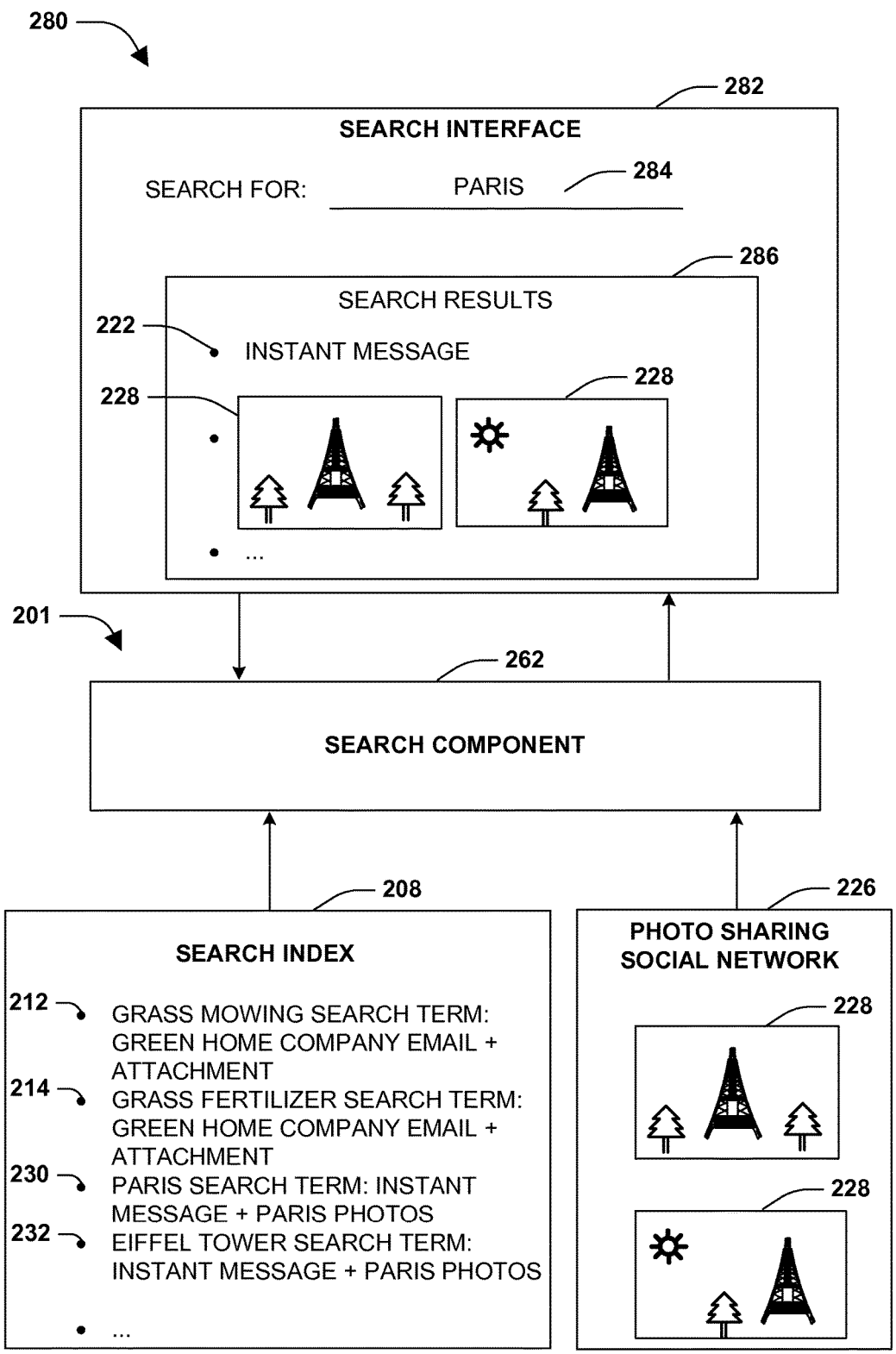
FIG. 2E is a component block diagram illustrating an exemplary system for deep content searching.

FIG. 2E illustrates an example 280 of deep content searching by the search component 262. The search component 262 may be configured to receive a search query (e.g., a Paris search query 284) from a search interface 282. The search component 262 may evaluate the search index 208 using the Paris search query 284. For example, the search component 262 may determine that the fourth indexed item 230 associated with the Paris search term and the fifth indexed item 232 associated with the Eiffel tower search term 232 correspond to the Paris search query 284. Accordingly, the search component 262 may provide the instant message parent content 222 and/or the photo referenced content 228 from the photo sharing social network 226 as search results 286, for the Paris search query 284, through the search interface 282.

Figure 3A:
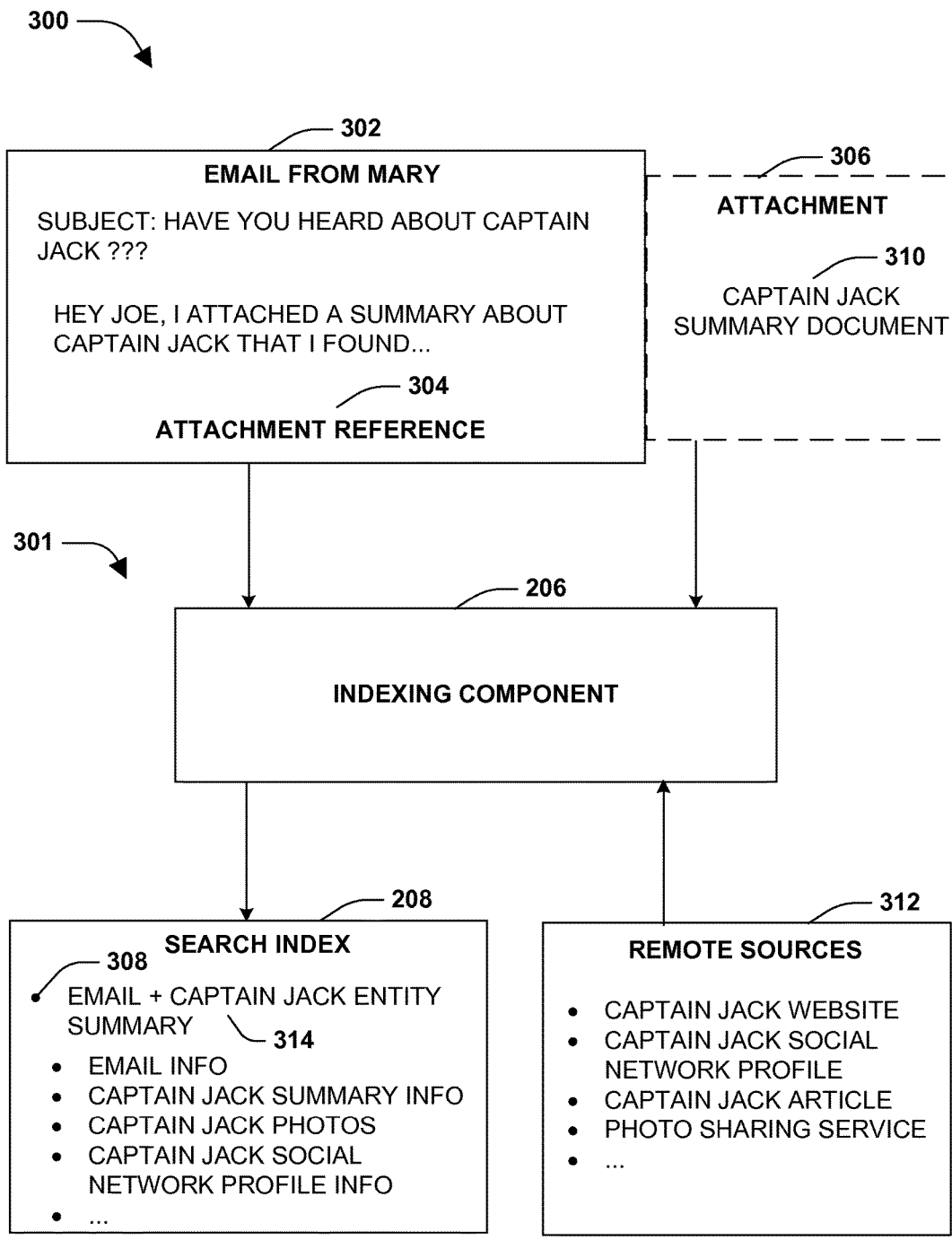
FIG. 3A is a component block diagram illustrating an exemplary system for indexing an entity summary.
Figure 3B:
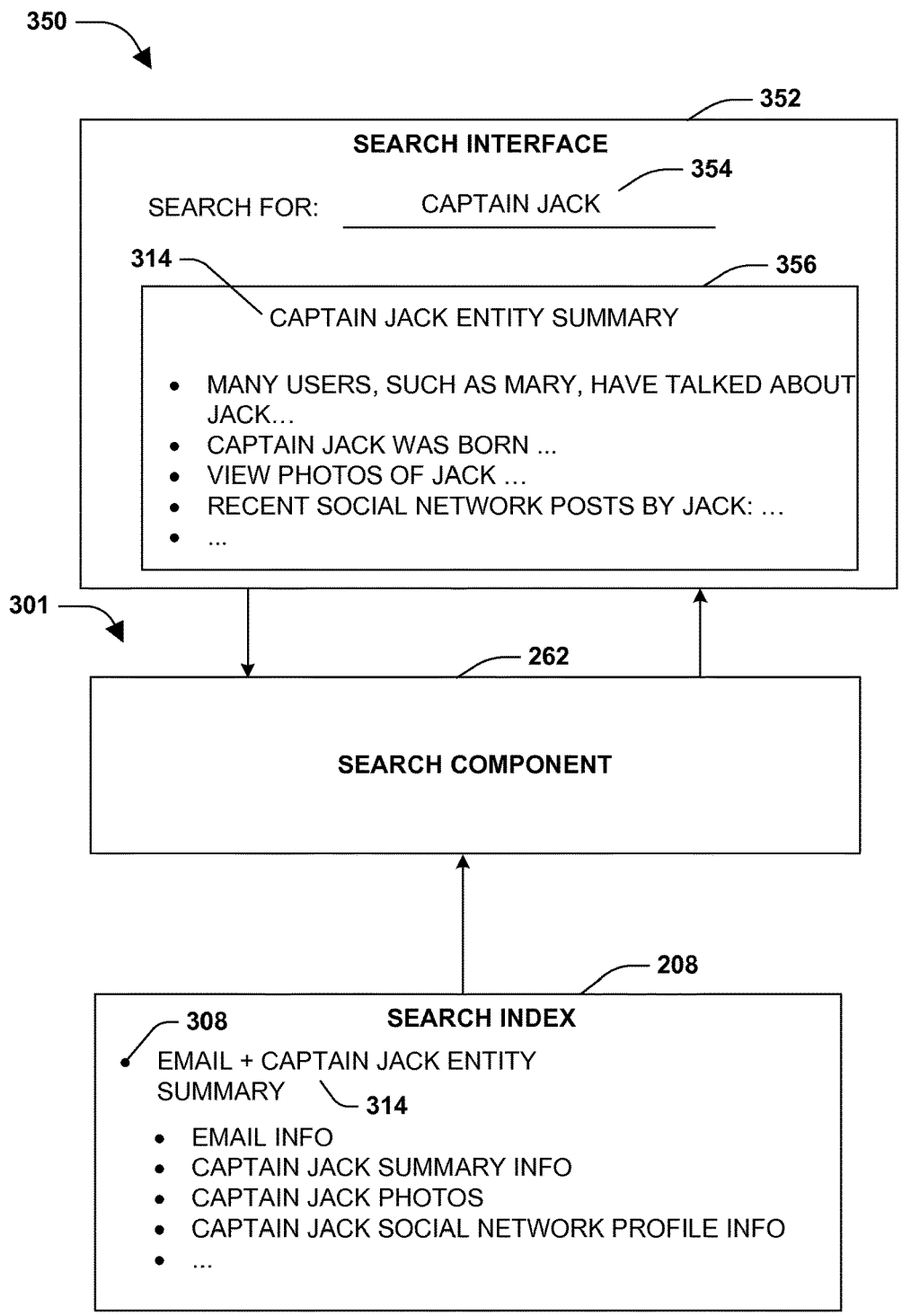
FIG. 3B is a component block diagram illustrating an exemplary system for providing an entity summary as a search result.

FIGS. 3A and 3B illustrate examples of a system 301, comprising the indexing component 206 and/or the search component 262, for indexing entity summaries and/or providing entity summaries as search results. FIG. 3A illustrates an example 300 of indexing an entity summary. The indexing component 206 may identify email parent content 302 (e.g., an email from Mary). The indexing component 206 may evaluate the email parent content 302, such as to identify an attachment reference 304 to attachment referenced content 306 comprising a Captain Jack summary document 310 describing a Captain Jack entity. The Captain Jack entity may, for example, be identified based upon text of the email parent content 302 referencing Captain Jack and/or based upon the Captain Jack summary document 310 describing Captain Jack. The indexing component 206 may acquire descriptive information for the Captain Jack entity, such as email info, Captain Jack summary info, Captain Jack photos, Captain Jack social network profile info, etc., from various remote sources 312 such as a Captain Jack website, a Captain Jack social network profile, a Captain Jack article, a photo sharing service, etc. The indexing component 206 may generate an entity summary for the entity based upon the descriptive information, such as a Captain Jack entity summary 314. The Captain Jack entity summary 314 may be indexed with the email parent content 302 into the search index 208 as an indexed item 308.

FIG. 3B illustrates an example 350 of providing an entity summary as a search result. The search component 262 may receive a search query, such as a Captain Jack search query 354, through a search interface 352. The search component 262 may evaluate the search index 208 using the Captain Jack search query 354. Responsive to the Captain Jack search query 354 corresponding to the indexed item 308 indicating a relationship between the email parent content 302 and the Captain Jack entity summary 314, the email parent content 302, the descriptive information for the Captain Jack entity, and/or the Captain Jack entity summary 314 may be provided as search results 356, for the Captain Jack search query 354, through the search interface 352.

According to an aspect of the instant disclosure, a method for indexing referenced content is provided. The method includes evaluating parent content to identify a reference to referenced content hosted by a content source. The referenced content may be acquired from the content source using the reference. The referenced content may be evaluated to determine a search term that is descriptive of the referenced content. The referenced content may be indexed with the parent content into a search index using the search term.

According to an aspect of the instant disclosure, a system for indexing referenced content is provided. The system includes an indexing component. The indexing component is configured to identify a reference to referenced content hosted by a content source. The indexing component is configured to acquire the referenced content from the content source using the reference. The indexing component is configured to evaluate the referenced content to determine a search term that is descriptive of the referenced content. The indexing component is configured to index the referenced content with the parent content into a search index using the search term.

According to an aspect of the instant disclosure, a computer readable medium comprising instructions which when executed perform a method for indexing referenced content is provided. The method includes evaluating parent content to identify a reference to referenced content hosted by a content source. The referenced content may be acquired from the content source using the reference. The referenced content may be evaluated to determine a search term that is descriptive of the referenced content. The referenced content may be indexed with the parent content into a search index using the search term.

According to an aspect of the instant disclosure, a means for indexing referenced content is provided. Parent content may be evaluated by the means for indexing to identify a reference to referenced content hosted by a content source. The referenced content may be acquired from the content source by the means for indexing using the reference. The referenced content may be evaluated by the means for indexing to determine a search term that is descriptive of the referenced content. The referenced content may be indexed by the means for indexing with the parent content into a search index using the search term.

Figure 4:
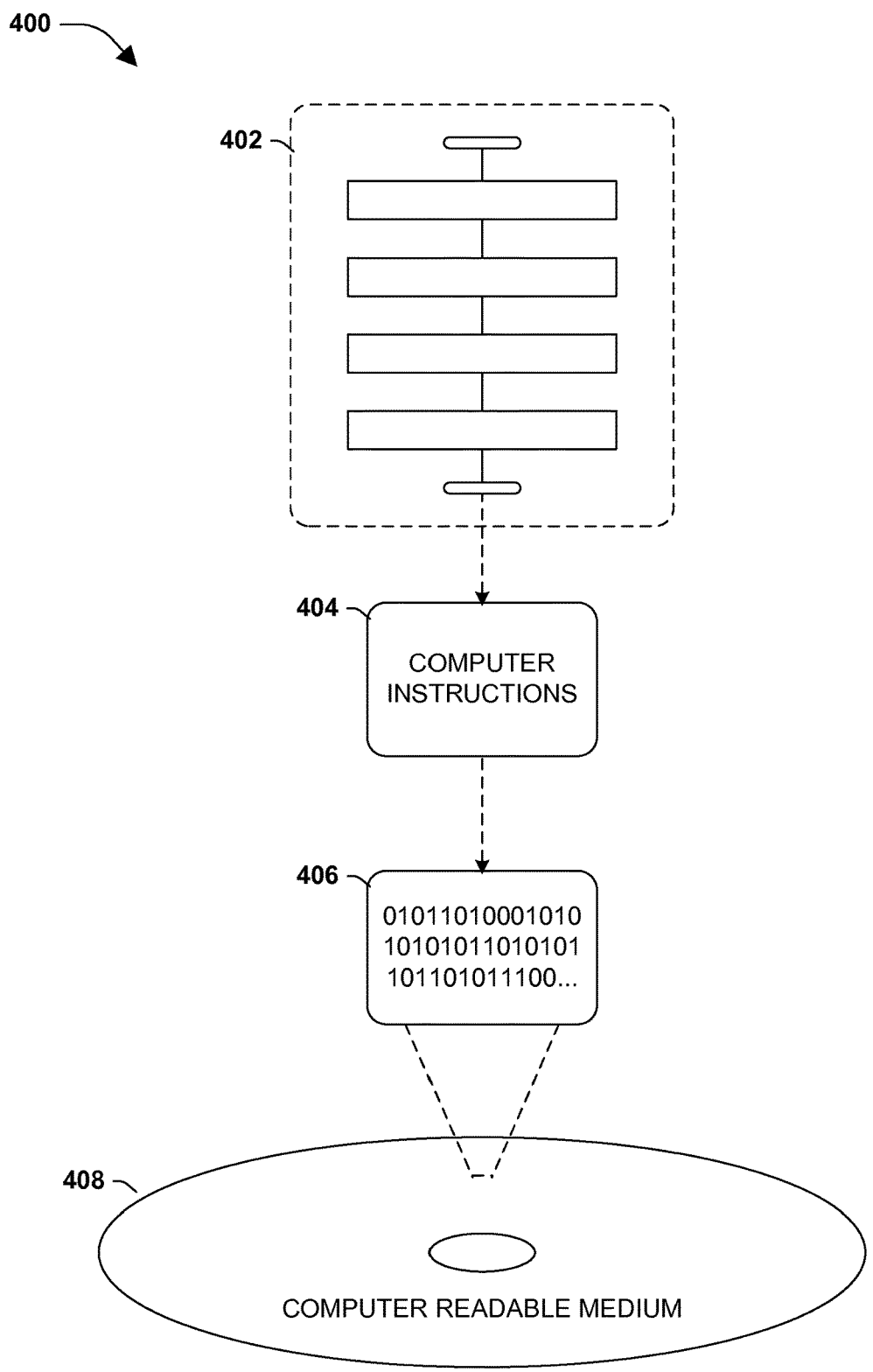
FIG. 4 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 4, wherein the implementation 400 comprises a computer-readable medium 408, such as a CD-R, DVD-R, flash drive, a platter of a hard disk drive, etc., on which is encoded computer-readable data 406. This computer-readable data 406, such as binary data comprising at least one of a zero or a one, in turn comprises a set of computer instructions 404 configured to operate according to one or more of the principles set forth herein. In some embodiments, the processor-executable computer instructions 404 are configured to perform a method 402, such as at least some of the exemplary method 100 of FIG. 1, for example. In some embodiments, the processor-executable instructions 404 are configured to implement a system, such as at least some of the exemplary system 201 of FIGS. 2A-2E and/or at least some of the exemplary system 301 of FIGS. 3A and 3B, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
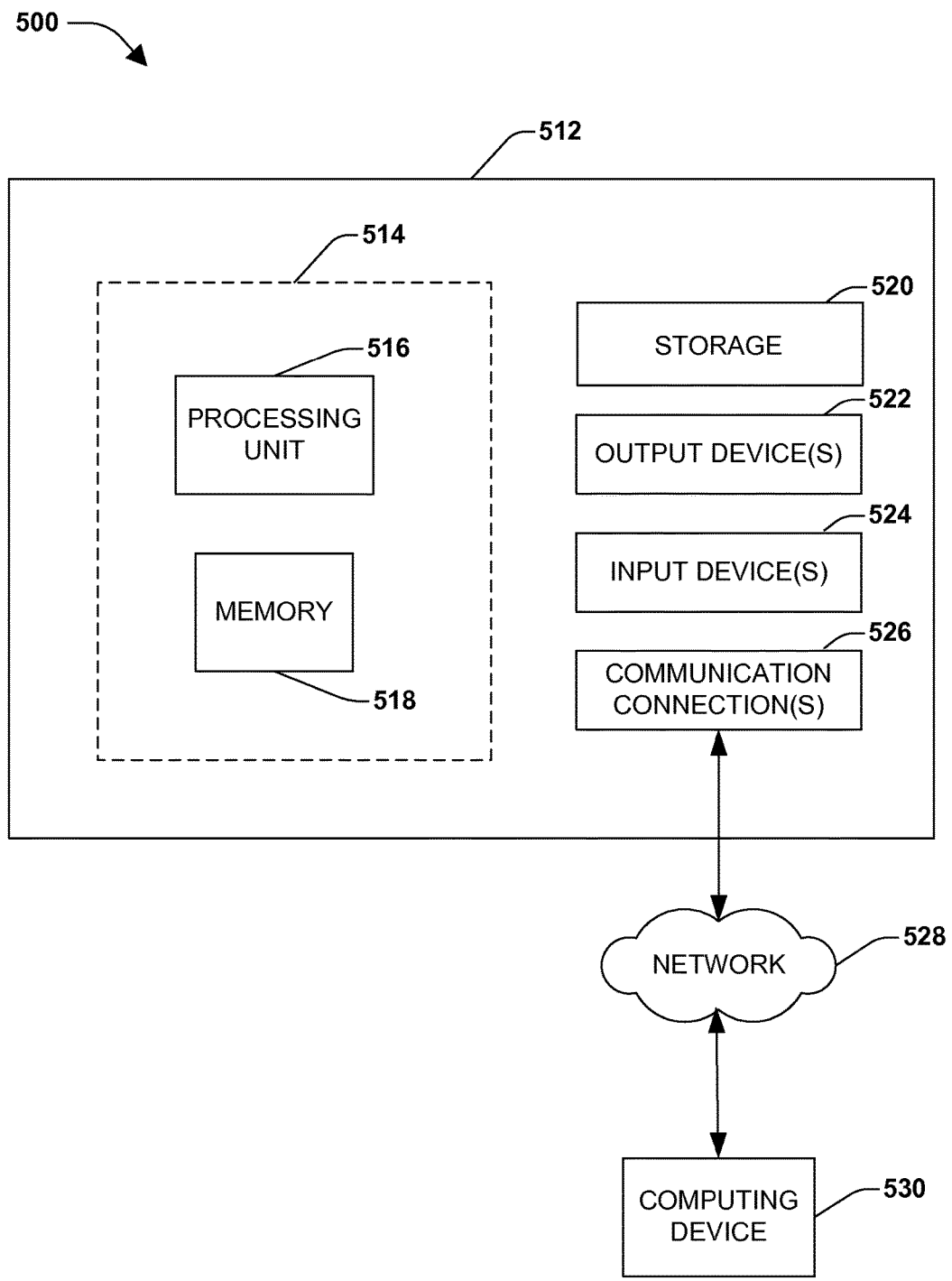
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 500 comprising a computing device 512 configured to implement one or more embodiments provided herein. In one configuration, computing device 512 includes at least one processing unit 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer readable instructions to implement one or more embodiments provided herein may be in storage 520. Storage 520 may also store other computer readable instructions to implement an operating system, an application program, and the like. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Computer storage media does not, however, include propagated signals. Rather, computer storage media excludes propagated signals. Any such computer storage media may be part of device 512.

Device 512 may also include communication connection(s) 526 that allows device 512 to communicate with other devices. Communication connection(s) 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection(s) 526 may include a wired connection or a wireless connection. Communication connection(s) 526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device(s) 524 such as keyboard, mouse, pen, voice input device, touch input device, infrared cameras, video input devices, and/or any other input device. Output device(s) 522 such as one or more displays, speakers, printers, and/or any other output device may also be included in device 512. Input device(s) 524 and output device(s) 522 may be connected to device 512 via a wired connection, wireless connection, or any combination thereof. In one embodiment, an input device or an output device from another computing device may be used as input device(s) 524 or output device(s) 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer readable instructions may be distributed across a network. For example, a computing device 530 accessible via a network 528 may store computer readable instructions to implement one or more embodiments provided herein. Computing device 512 may access computing device 530 and download a part or all of the computer readable instructions for execution. Alternatively, computing device 512 may download pieces of the computer readable instructions, as needed, or some instructions may be executed at computing device 512 and some at computing device 530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing deep content search results by indexing referenced content, comprising:
    evaluating parent content to identify a reference contained in the parent content, wherein the reference comprises a link to the referenced content, and wherein the referenced content is external to the parent content and is hosted by a content source;
    acquiring the referenced content from the content source using the reference;
    evaluating the referenced content to determine a search term that is descriptive of the referenced content;
    indexing the referenced content with the parent content into a search index using the search term, wherein indexing the referenced content with the parent content makes the external referenced content accessible to a search function directed to the parent content;
    receiving a search query; and
    evaluating the search index using the search query, comprising:
        responsive to the search query corresponding to the search term, providing at least the referenced content as a search result for the search query.

2. The method of claim 1, comprising:
    responsive to the search query corresponding to the search term, providing the search result, comprising the parent content, for the search query.

3. The method of claim 1, the indexing comprising:
identifying a portion of the referenced content having a descriptive relevancy exceeding a threshold; and
indexing the portion of the referenced content with the parent content into the search index using the search term.

4. The method of claim 1, comprising:
identifying an entity referenced by the parent content;
acquiring descriptive information for the entity from a remote source;
generating an entity summary for the entity based upon the descriptive information; and
indexing the entity summary with the parent content into the search index.

5. The method of claim 4, the acquiring descriptive information comprising:
submitting an entity identifier, of the entity, to a search engine; and
evaluating search results provided by the search engine for the entity identifier to identify the descriptive information.

6. The method of claim 4, comprising:
receiving a second search query;
evaluating the search index using the second search query, the evaluating comprising:
responsive to the second search query corresponding to the entity summary, providing at least one of the parent content, the descriptive information for the entity, or the entity summary as a search result for the second search query.

7. The method of claim 1, the evaluating the referenced content comprising:
identifying a website comprising an anchor term that links to the referenced content, the anchor term comprising descriptive information for the referenced content; and
determining the search term based upon at least one of the descriptive information or the anchor term.

8. The method of claim 7, comprising:
identifying a term within the referenced content as a second search term; and
assigning a first relevancy weighting to the search term that is different than a second relevancy weighting assigned to the second search term.

9. The method of claim 1, the referenced content comprising content that is attached to the parent content or is remotely referenced by the parent content.

10. The method of claim 1, the parent content comprising a message, and the reference comprising at least one of an attachment indicator indicative of an attachment to the message or a URL link within the message to a remote content source.

11. The method of claim 1, the referenced content comprising at least one of a website referenced by a URL within the parent content, an attached file attached to the parent content, a local file on a client device associated with the parent content, a publically available file, a non-publically available file, an image, an article, a social network profile, a video, or content that is remote to the parent content.

12. The method of claim 1 comprising:
annotating the search result with an annotation identifying the content source.

13. The method of claim 1, the acquiring the reference content comprising:
identifying a set of credentials utilized by a user to access the content source; and
authenticating with the content source using the set of credentials.

14. The method of claim 1, wherein the parent content comprises a social network post.

15. The method of claim 1, wherein the parent content comprises an email message or an instant message.

16. A system for performing deep content searching by indexing referenced content, comprising:
an indexing component, comprising one or more processors, configured to:
evaluate parent content to identify a reference contained in the parent content, wherein the reference indicates referenced content that is external to the parent content;
acquire the referenced content using the reference;
evaluate the referenced content to determine a search term that is descriptive of the referenced content;
index the referenced content with the parent content into a search index using the search term, wherein indexing the referenced content with the parent content makes the referenced content accessible to a search function; and
a search component, comprising one or more processors, configured to:
receive a search query; and
evaluate the search index using the search query, comprising:
responsive to the search query corresponding to the search term, providing at least one of the parent content or the referenced content as a search result for the search query.

17. The system of claim 16, the parent content comprising a message, and the referenced content comprising at least one of an attached file attached to the message or a URL link within the message to a remote content source.

18. The system of claim 16, the indexing component configured to:
identify an entity referenced by the parent content;
acquire descriptive information for the entity from a remote source;
generate an entity summary for the entity based upon the descriptive information; and
index the entity summary with the parent content into the search index.

19. The system of claim 18, the search component configured to:
receive a second search query;
evaluate the search index using the second search query, comprising:
responsive to the second search query corresponding to the entity summary, providing at least one of the parent content, the descriptive information, or the entity summary as a search result for the second search query.

20. One or more computer storage media having embodied thereon computer-usable instructions which, when executed, perform a method for performing deep content searching by indexing referenced content, comprising:
evaluating parent content to identify a link to referenced content, wherein the referenced content is external to the parent content and is hosted by a content source;
acquiring the referenced content from the content source using the link;
evaluating the referenced content to determine a search term that is descriptive of the referenced content;
indexing the referenced content with the parent content into a search index using the search term, wherein indexing the referenced content with the parent content makes the referenced content accessible to a search function;

receiving a search query; and evaluating the search index using the search query, comprising:

when the search query corresponds to the parent content, then responsive to the search query providing at least the parent content as search results for the search query; and when the search query corresponds to the referenced content, then responsive to the search query providing at least the referenced content as the search results for the search query.

\* \* \* \* \*